United States Patent
Serizawa et al.

(10) Patent No.: US 7,006,264 B2
(45) Date of Patent: Feb. 28, 2006

(54) IMAGE SCANNER FOR PHOTOGRAPHIC FILM

(75) Inventors: Mitsuhiko Serizawa, Kanagawa (JP); Yoshio Ozawa, Kanagawa (JP); Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 871 days.

(21) Appl. No.: 09/984,203

(22) Filed: Oct. 29, 2001

(65) Prior Publication Data

US 2002/0051218 A1    May 2, 2002

(30) Foreign Application Priority Data

Oct. 27, 2000    (JP)    .............................. 2000-328473

(51) Int. Cl.
 *H04N 1/04*    (2006.01)
(52) U.S. Cl. ...................................... 358/487; 358/506
(58) Field of Classification Search ................ 358/487, 358/506, 496, 498, 474, 505; 348/96, 97, 348/98; 355/75, 73, 72, 53, 407, 408, 35, 355/40, 41; 382/318, 319, 312; 396/570; 399/396, 384, 387, 377, 378
See application file for complete search history.

(56) References Cited

U.S. PATENT DOCUMENTS

| 5,585,879 | A | * | 12/1996 | Tahara et al. | ................ | 396/570 |
| 5,644,356 | A | * | 7/1997 | Swinson et al. | .............. | 348/96 |
| 6,169,571 | B1 | * | 1/2001 | Rivers et al. | .................. | 348/96 |
| 6,583,896 | B1 | * | 6/2003 | Suzuki et al. | ............... | 358/487 |

FOREIGN PATENT DOCUMENTS

JP    2000-75417    3/2000

* cited by examiner

*Primary Examiner*—Cheukfan Lee
(74) *Attorney, Agent, or Firm*—Sughrue Mion, PLLC

(57) ABSTRACT

There is disclosed a film scanner for scanning picture frames on photographic film. A plurality of filmstrips are spliced into a long photographic film web (17) and wound around a reel when placed in a film supply device (42) of the film scanner. The photographic film web is advanced from the supply reel through a film passageway to a film wind-up device (44). The film supply device and the film wind-up device are provided with loop formers (83, 91) for forming loops (17c, 17d) of the photographic film web before and behind a movable film table (52). After a picture frame of the photographic film web is positioned and fixed in a light permeable window (56) of the film table, the film table is moved back and forth along the film passageway. In synchronism with the reciprocating movement of the film table, the film scanner sequentially makes pre-scanning, focusing and fine scanning.

16 Claims, 10 Drawing Sheets

IMAGE SCANNER FOR PHOTOGRAPHIC FILM

BACKGROUND OF THE INVENTION

1. Field of the Invention

The present invention relates to an image scanner, especially for reading out images of picture frames photographed on photographic film.

2. Background Art

A film scanner has been known in the art, wherein picture frames on photographic film are scanned through an imaging device, like a CCD, to obtain electronic image signals of the picture frames. The image signals are converted into digital image data, and processed for printing images on photographic paper or the like on the basis of the image data. To scan the picture frames, light is projected from a light source onto the photographic film, and those light components which pass through the picture frame are received on the CCD, and converted into the image data.

In an example of a film scanner, the filmstrip is continuously advanced along a film passageway, and the light source projects light in synchronism with the movement of the filmstrip, to scan the picture frame in a sequential manner. In another example of a film scanner, the filmstrip is advanced by use of such a film carrier as disclosed in Japanese Laid-open Patent Application No. 2000-75417. The film carrier as disclosed in this prior art is provided with a supporting member that is movable in the film advancing direction. The film strip is placed in the supporting member, and the picture frames are scanned through a CCD in synchronism with the movement of the supporting member.

In such a film scanner using the film carrier with the above mentioned movable supporting member, the filmstrip should conventionally be placed each individually in the supporting member. Therefore, this type of film scanner cannot efficiently scan a large number of picture frames on a plurality of filmstrips which are forwarded from different customers to a photofinisher in order for printing. It might be possible to splice the filmstrips into a long web, and supply the long film web from a reel to the film carrier. In that case, however, it would be necessary to move the long film web back and forth along with the movement of the supporting member, so a complicated control sequence would be needed for winding and unwinding the long film web.

SUMMARY OF THE INVENTION

In view of the foregoing, an object of the present invention is to provide an image scanner for photographic film, that scans picture frames of a number of filmstrips in a continuous succession at a high efficiency.

According to the present invention, an image scanner for scanning picture frames photographed on photographic film comprises a film advancing device for advancing a long web of the photographic film in a film advancing direction from a reel of a film supply device through a film passageway to a film wind-up device; a film table disposed on the film passageway and movable along the film passageway, for carrying the photographic film thereon; a light permeable window formed through the film table, the light permeable window having a size that covers a scanning area to scan within each of the picture frames; a frame positioning device for positioning the picture frames individually in the light permeable window; a light projection device for projecting light toward the photographic film through the light permeable window; a linear image sensor disposed across the film passageway from the light projection device, for obtaining an image signal from an optical image that is formed through an image-forming lens from light components passing through the picture frame as positioned in the light permeable window; a film table conveying device for conveying the film table along the film passageway back and forth between an initial position and a terminal position after one of the picture frames is positioned and fixed to the light permeable window, to let the image sensor scan the positioned picture frame line by line; and a loop former for forming a first loop of the photographic film between the film supply device and the film table and a second loop of the photographic film between the film table and the film wind-up device.

Because of the loops formed before and behind the film table, too much tension will not be applied to the photographic film even while the photographic film moves together with the film table back and forth along the film passageway. Accordingly, the picture frame is there is no need for controlling the film supply device and the film wind-up device to move the photographic film back and forth following the movement of the film table.

The long web of photographic film may be formed by splicing a plurality of filmstrips having different picture frames thereon. Then, a large number of picture frames are automatically scanned with high efficiency.

The lengths of the first and second loops are preferably determined such that the first loop has a maximum length before the start of the forward movement of the film table, whereas the second loop has a maximum length before the start of the backward movement of the film table, and that the maximum lengths of the first and second loops are greater than a distance between the initial position and the terminal position.

According to a preferred embodiment, the frame positioning device comprises a frame position detecting device for detecting position data of each of those picture frames which are determined to be scanned, and a fine adjusting device for adjusting position of the picture frame relative to the light permeable window by feeding the photographic film back or forth on the film table with reference to the position data. The fine adjusting device makes it possible to adjust the position of each picture frame relative to the light permeable window independently of the film supply device and the film wind-up device. In that case, the loop prevents the photographic film from being undesirably tensed.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF PREFERRED EMBODIMENTS

Figure 1:
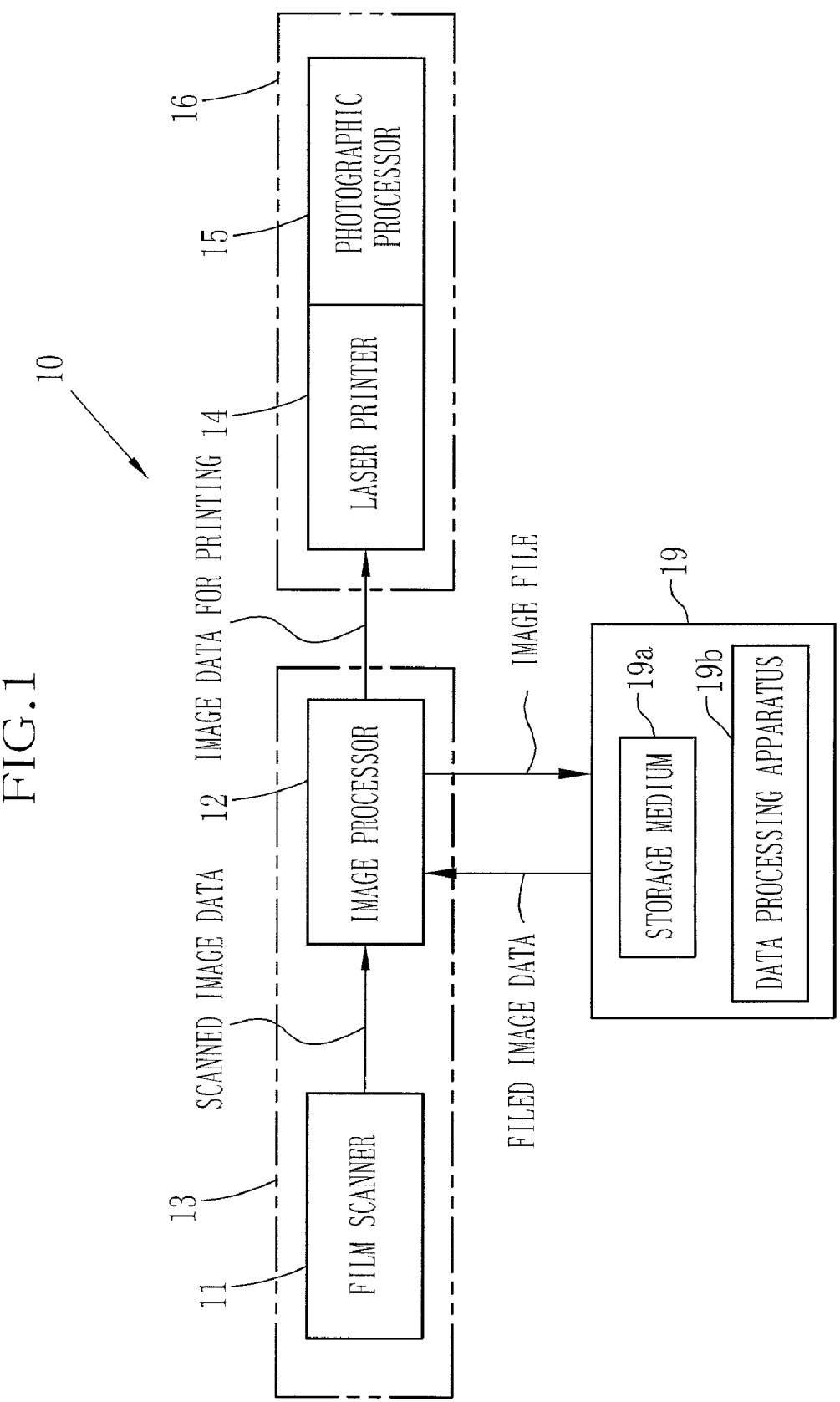
FIG. 1 is a block diagram illustrating a digital photo-lab system including a film scanner of the present invention.

FIG. 1 schematically shows a fundamental structure of a digital photo-lab system 10. The digital photo-lab system 10 consists of an input device 13 including a film scanner 11 and an image processor 12, and an output device 16 including a laser printer 14 and a photographic processor 15.

The film scanner 11 scans picture frames on photographic film through a linear CCD image sensor. The film scanner 11 may scan different types of photographic film, including negative and reversal filmstrips of ISO135 type, IX240 type, ISO110 type, ISO120 type and ISO220 type. Different types of film carriers are used for different film types, or a compatible film carrier whose film passageway and masking size are changeable is commonly used for some film types.

The image processor 12 processes image data as obtained through the film scanner 11, and feeds the processed image data to the laser printer 14. The image processing includes gray-balance control, gradation correction, brightness or density control, matrix correction according to light source type, and image saturation or color correction. Besides these fundamental processes, the image data may eventually be processed for electronic magnification changing, compression or expansion of density dynamic range, sharpening and so on. The image processor 12 executes the image processing by use of low-pass filters, adders, LUTs, matrix filters and the like.

The image processor 12 also outputs the processed image in the form of an image file to an external device, including a storage medium 19a, like a memory card and a CD-ROM, and a data processing apparatus 19b that is connected to the image processor 12 through a communication line or network.

The laser printer 14 is provided with laser light sources for red, green and blue and a modulator. The modulator modulates laser beams from the laser light sources in accordance with the image data from the image processor 12, and the modulated laser beams are swept across photographic paper to print images on the photographic paper. The photographic processor 15 processes the exposed photographic paper by developing, bleaching, fixing, rinsing and drying the same.

Figure 2:
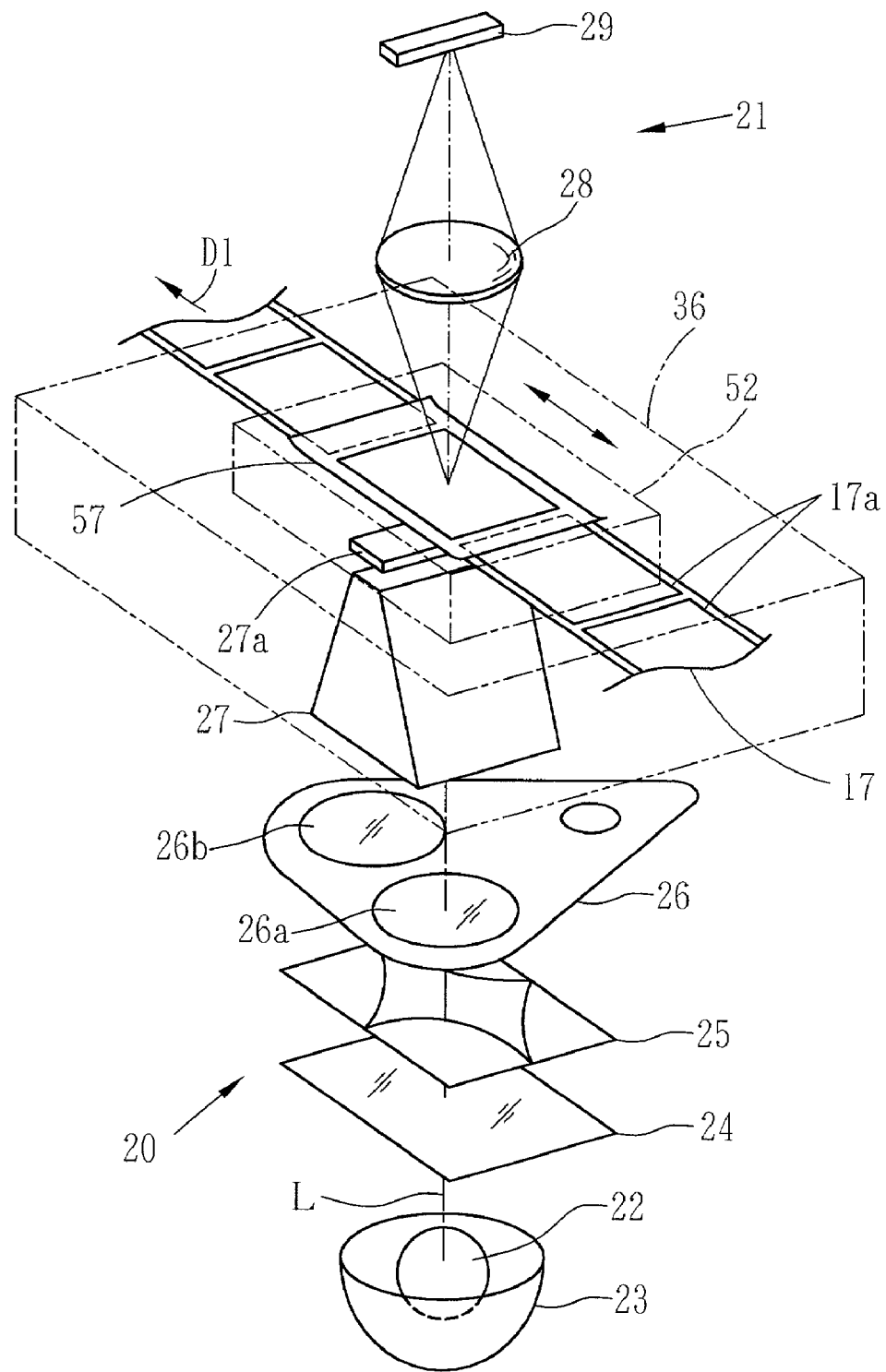
FIG. 2 is an explanatory perspective view illustrating essential parts of a film scanner according to a first embodiment of the present invention.

FIG. 2 shows essential parts of a light source section 20 and an optical image reading section 21 of the film scanner 11 according to an embodiment of the present invention. The light source section 20 has a light source 22 constituted of a metal halide lamp or a halogen lamp. The light source 22 is located in a focal position of a reflector 23 that is made of a material transparent to infrared rays. The reflector 23 has a parabolic reflection surface and reflects light from the light source 22 toward the photographic film web 17. The light source 22 may alternatively be constituted of LED or the like.

On the light path from the light source 22 to the photographic film web 17, there are disposed an infrared cut filer 24, an adjustable stop plate 25, a balance filter 26, a light diffusion box 27, and a diffusion plate 27a in this order from the light source 22. The stop plate 25 may be inserted a variable amount into the light path from the light source section 20, thereby to control the amount of light passing through it. The balance filter 26 is for controlling color temperature, and consists of a first filter 26a for negative film and a second filter 26b for reversal film, one of which is inserted in the light path depending upon whether the photographic film web 17 is negative or reversal.

The optical image reading section 21 includes an image forming lens unit 28 and a linear CCD image sensor 29, which are disposed on the opposite side of the photographic film web 17 from the light source section 20, and on an optical axis L of the light source section 20. The image forming lens unit 28 forms an optical image of a picture frame 17a of the photographic film web 17 on a photo-receiving surface of the CCD image sensor 29. Although the image forming lens unit 28 is shown as a single lens in FIG. 2, it may be composed of a plurality of lens elements that constitute a zoom lens system. The image forming lens unit 28 is movable in a limited range along the optical axis L, and a not-shown lens motor is connected to the image forming lens unit 28 to move it for focusing.

The CCD image sensor 29 is constituted of three rows of CCD cells, each row extending perpendicular or transversely to an advancing direction D1 of the photographic film web 17. Hereinafter the extending direction of the CCD cell rows will be referred to as a main scan direction, whereas the film advancing direction D1 will be referred to as a sub scan direction with respect to the image sensor 29. The three rows of CCD cells respectively detect red, green and blue light components. Since red, green and blue light components of one pixel are detected by three CCD cells which are aligned in the sub scan direction, the detection timings of these three color components of the same pixel are shifted from each other. To output photometry signals for the three colors of the same pixel at the same time, output timings of the photometry signals are delayed from the detection timings in compensation for the shift amounts in the detection timings between the three colors. The photometry signals are sent from the CCD image sensor 29 to the image processor 12.

Figure 3:
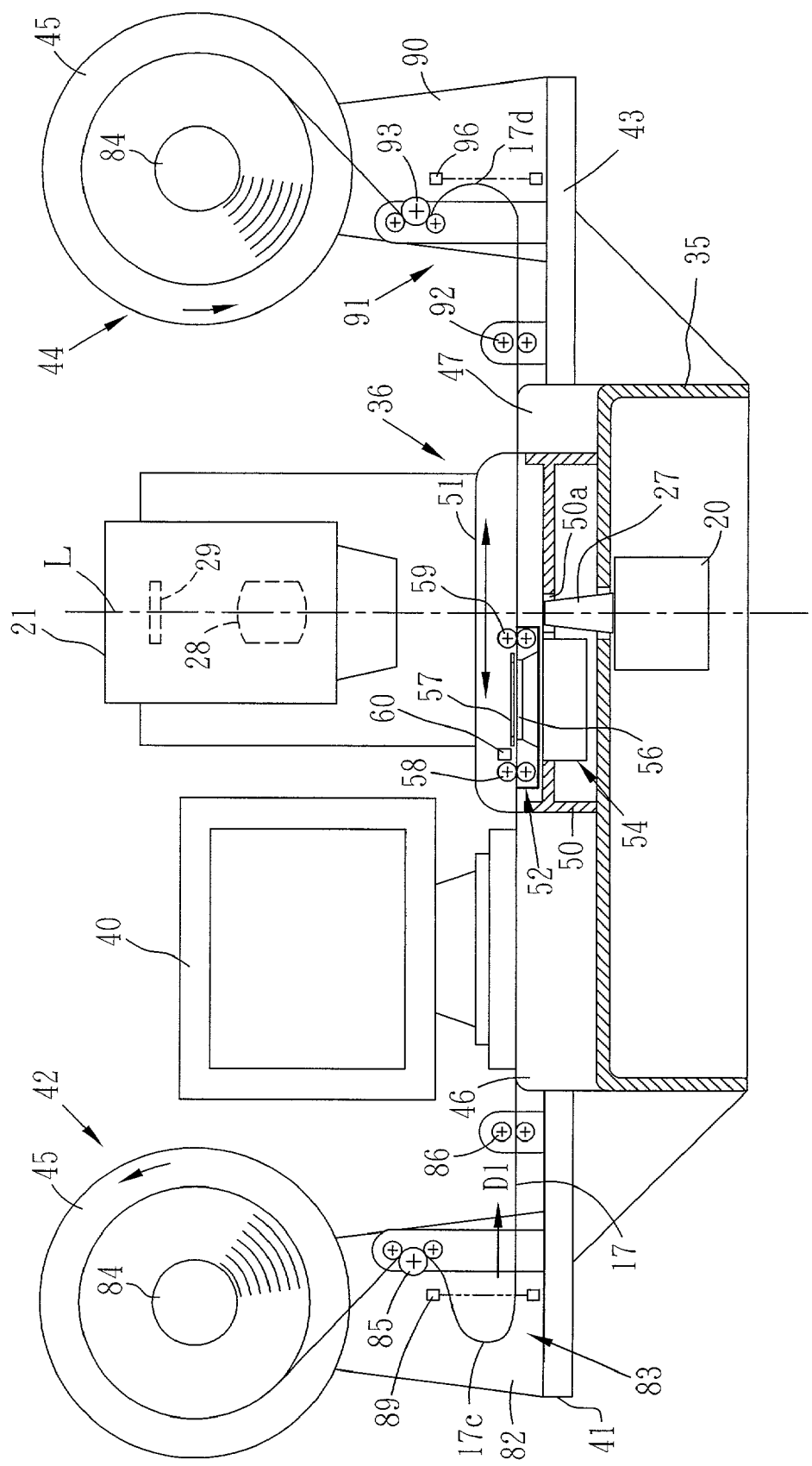
FIG. 3 is a front view illustrating the overall structure of the film scanner.
Figure 4:
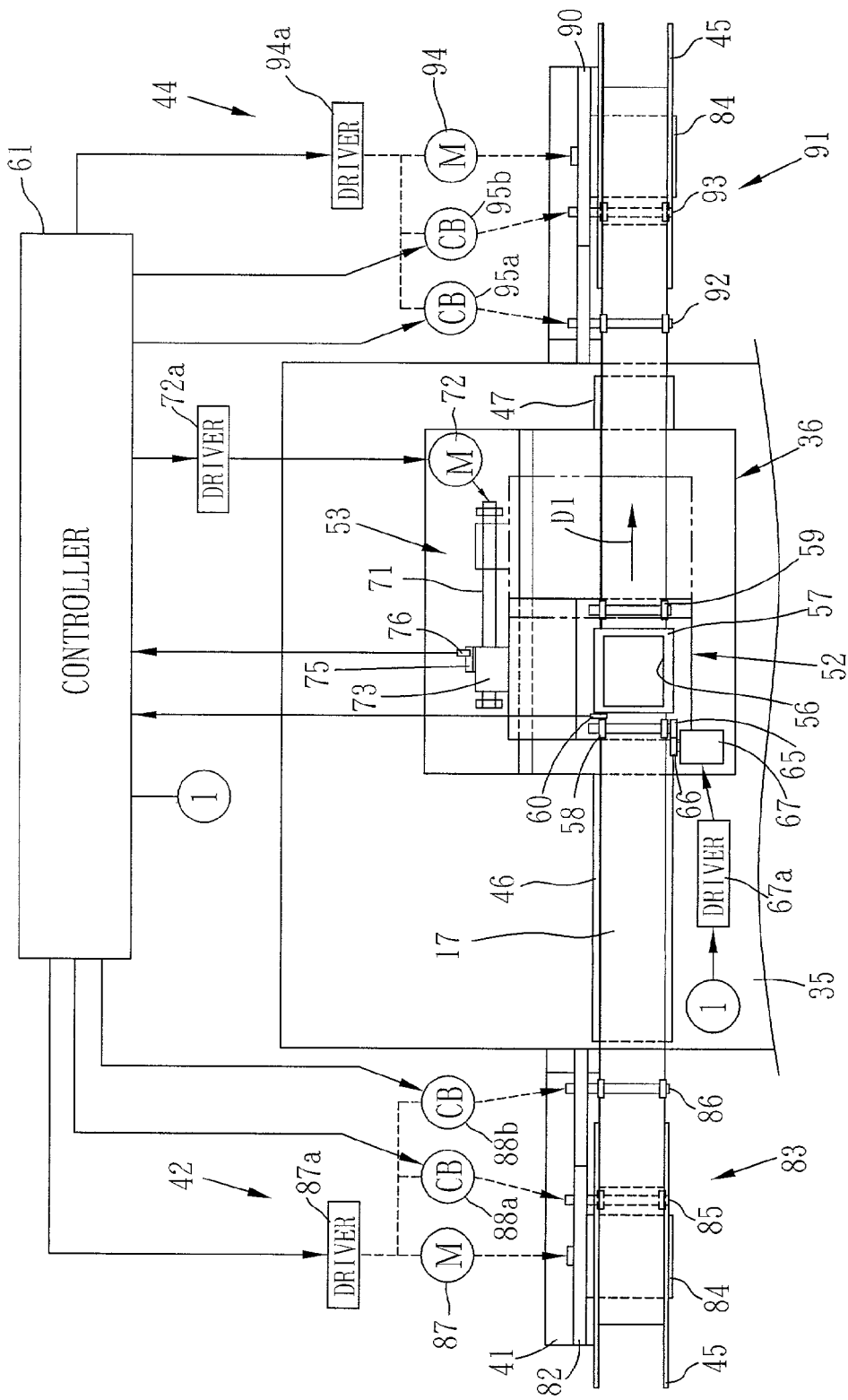
FIG. 4 is a top plan view of the film scanner.

FIGS. 3 and 4 show the overall structure of the film scanner 11. A film carrier 36 is removably mounted on a work table 35. The light source section 20 is disposed inside the work table 35, to illuminate the photographic film web 17 as placed in the film carrier 36. The optical reading section 21 is disposed above the film carrier 36. A display device 40 is disposed on the left side of the optical image reading section 21 in FIG. 3, for displaying a video image of the scanned picture frame. A film supply device 42 is removably mounted on the left end of the work table 35 through a bracket 41. On the right end of the work table 35 is mounted a film wind-up device 44 removably through a bracket 43. The photographic film web 17 is guided along film guides 46 and 47 from a film reel 45 of the film supply device 42 to a film reel 45 of the film wind-up device 44. The photographic film web 17 is constituted of a plurality of filmstrips spliced into a long web, and is developed after being spliced into the long web.

The film carrier 36 is constituted of a stationary base table 50, a cover 51, a movable film table 52, a film table conveying mechanism 53 for moving the film table 52 on the base table 50, and an illumination box 54. The base table 50 has an opening 50a in its center portion, and a top surface of the light diffusion box 27 of the light source section 20 is placed in the opening 50a. The light from the light source 22 is projected through the opening 50a toward the photographic film web 17 during a scanning process as set forth in detail below. The illumination box 54 is disposed on the upstream side of the opening 50a in the film advancing direction D1.

Figure 5:
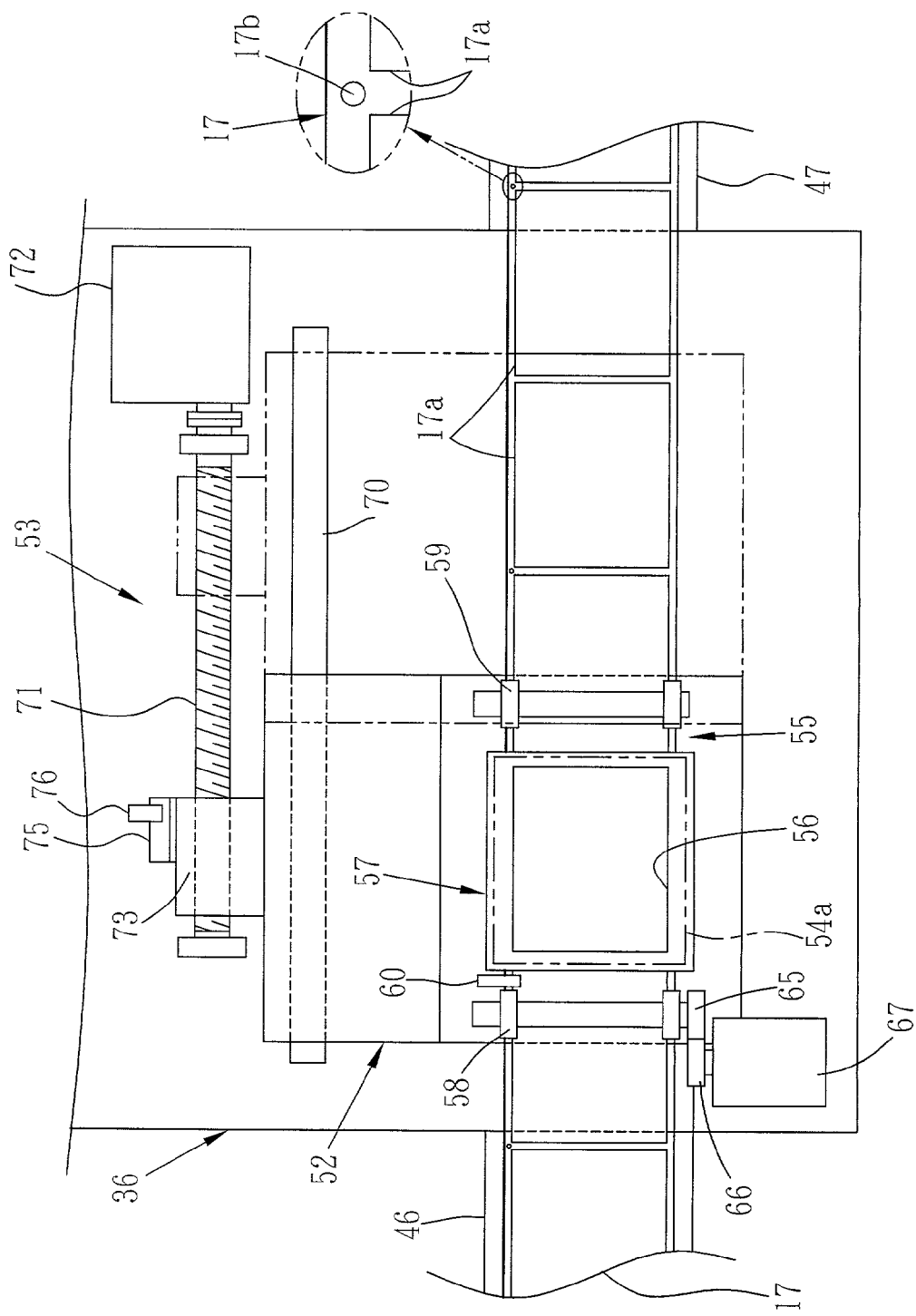
FIG. 5 is a top plan view schematically illustrating an interior of a film carrier of the film scanner.

The illumination box 54 is an illumination device having a light emission surface 54a on its top side. The light emission surface 54a is larger than a light permeable window 56 of the film table 52, as shown in FIG. 5, and illuminates the picture frame 17a of the photographic film web 17 as placed on the film table 52, so that the operator may observe the position as well as the content of the picture frame 17a on the film table 52. According to the present embodiment, the cover 51 does not cover the moving range of the movable film table 52, so the operator can directly observe the photographic film web 17 on the film table 52. Thus, the portion above the moving range of the table 52 serves as a see-through observation window. The cover 51 may have a transparent observation window that covers up the moving range of the film table 52, to permit observing the picture frame 17a through it. It is also possible to provide reference lines on the transparent window, for positioning the picture frame 17a.

As shown in FIG. 5, a film passageway 55 through the film carrier 36 is provided on the top of the film table 52, and the light permeable window 56 is formed through a center of the film table 52. The light permeable window 56 corresponds in size to one picture frame of the photographic film web 17. A carrier mask 57 is disposed above the light permeable window 56. The carrier mask 57 is movable up and down, and is moved upward from the film passageway while the photographic film web 17 is being conveyed through the film carrier 36. When scanning the picture frame 17a, the carrier mask 57 is moved down by a not-shown solenoid or a not-shown coil spring, to press down the photographic film web 17 and keep the picture frame 17a flat.

The film table 52 has two pairs of film feed rollers 58 and 59 mounted before and behind the light permeable window 56 in the film advancing direction D1. A hole sensor 60 for detecting holes 17b of the photographic film web 17 is disposed between the light permeable window 56 and the upstream film feed roller pair 58 that is provided before the light permeable window 56 in the film advancing direction D1. The holes 17b are formed through the photographic film web 17 as positioning indicia only for those picture frames 17a which are to be scanned, and are formed during a film inspection process after splicing and developing the photographic film web 17. The hole 17b is located in a same position relative to each picture frame 17a to be scanned. In the present embodiment, the hole 17b is formed at a marginal position between two picture frames 17a and adjacent a forward corner of the picture frame 17a to be scanned. Accordingly, the picture frame 17a is positioned precisely relative to the light permeable window 56 by advancing the photographic film web 17 a predetermined length from where the hole sensor 60 detects the hole 17b.

The film feed roller pairs 58 and 59 are interconnected to each other through a not-shown belt, to rotate synchronously with each other. A driven gear 65 is secured to one end of an axle of the upstream film feed roller pair 58. When the film table 52 is placed in a film receiving position, the driven gear 65 interlocks with a drive gear 66 that is provided in the base table 50. Then, a driving force of a film feed motor 67 disposed underneath the base table 50 is transmitted through the gears 66 and 65 to the film feed roller pairs 58 and 59. As shown in FIG. 4, the film feed motor 67 is connected through a driver 67a to a controller 61, so the controller 61 drives the film feed motor 67 to rotate in a direction to feed the photographic film web 17 in the film advancing direction D1.

As shown in FIG. 5, the film table conveying mechanism 53 is constituted of a guide rod 70, a lead screw 71, and a scanning motor 72. The guide rod 70 is oriented in parallel to the moving direction of the film table 52, and guides the film table 52. The lead screw 71 is oriented in parallel to the guide rod 70, and is turned by the scanning motor 72. A female screw 73 of the film table 52 is mounted on the lead screw 71, so the female screw 73 and thus the film table 52 moves back and forth along the lead screw 71, as the lead screw 71 turns in one direction and another.

An initial position detecting plate 75 is secured to the film table 52, on a peripheral portion of the female screw 73 in this embodiment. The initial position detecting plate 75 is detected by an initial position sensor 76 when the film table 52 is in its initial position. In this embodiment, the initial position is where the light permeable window 56 is placed right above the illumination box 54. In the initial position, the driven gear 65 is in mesh with the drive gear 66, so the film feed roller pairs 58 and 59 are connected to the film feed motor 67. Accordingly, the photographic film web 17 may be advanced by driving the film feed motor 67, and the picture frame 17a is positioned precisely in the light permeable window 56 by rotating the film feed motor 67 for a predetermined time from when the hole sensor 60 detects the hole 17b.

As shown in FIGS. 3 and 4, the film supply device 42 is constituted of a reel holding arm 82 and a loop former 83. The reel holding arm 82 is secured to the bracket 41, and extends vertically to the bracket 41. A reel spool 84 is mounted on the top of the reel holding arm 82 in a rotatable manner. The loop former 83 consists of two pairs of film supply rollers 85 and 86, a motor 87 for rotating these feed rollers 85 and 86, clutch brakes 88a and 88b for the respective roller pairs 85 and 86, and a loop sensor 89. The motor 87 is connected through a driver 87a to the controller 61. The clutch brakes 88a and 88b are also connected to the controller 61. By providing a difference in film conveying speed between the film supply roller pairs 85 and 86, e.g. by intermittently stopping rotating the downstream film supply roller pair 86, the photographic film web 17 is formed into a loop 17c between these roller pairs 85 and 86. A not-shown shift mechanism is connected to the downstream film supply roller pair 86, to shift the rollers of the pair 86 between a nip position nipping the photographic film web 17 and a release position releasing the photographic film web 17. The roller pair 86 is set to the nip position while the loop 17c is being formed. After the loop 17c becomes a predetermined amount, the roller pair 86 is shifted to the release position.

The loop sensor 89 outputs a detection signal that represents the amount of the loop 17c. The detection signal is sent to the controller 61. When the detection signal indicates that there is no loop 17c in the loop former 83, the controller 61 controls the film feed motor 87 and the clutch brakes 88a and 88b so as to provide a difference between the rotational speed of the film supply roller pair 85 and that of the film supply roller pair 86, and also maintain the length of the loop 17c in a constant range. The length of the loop 17c is determined to be longer than a maximum length of movement of the film table 52, so the photographic film web 17 will not be too tensed even while the film table 52 moves back and forth in parallel to the film advancing direction D1. Therefore, the picture frame 17a is precisely positioned in the film carrier 36, and is scanned with accuracy.

Like the film supply device 42, the film wind-up device 44 has a reel holding arm 90 and a loop former 91, and is configured in the same way as the film supply device 42 except that the loop formers 83 and 91 are symmetrical. The loop former 91 of the film wind-up device 44 is constituted of two pair of film feed rollers 92 and 93, a film feed motor 94, clutch brakes 95a and 95b and a loop sensor 96, and provides a loop 17d of the photographic film web 17 by putting a speed difference between the two film feed roller pairs 92 and 93 in the same way as described with respect to the film supply device 42.

The controller 61 controls the overall operation of the film scanner 11 in accordance with signals entered through a not-shown control panel, as well as signals from the sensors. Specifically, the controller 61 controls scanning of the respective picture frames 17a on the photographic film web 17, and also controls direction and speed of the scanning motor 72.

Figure 6:
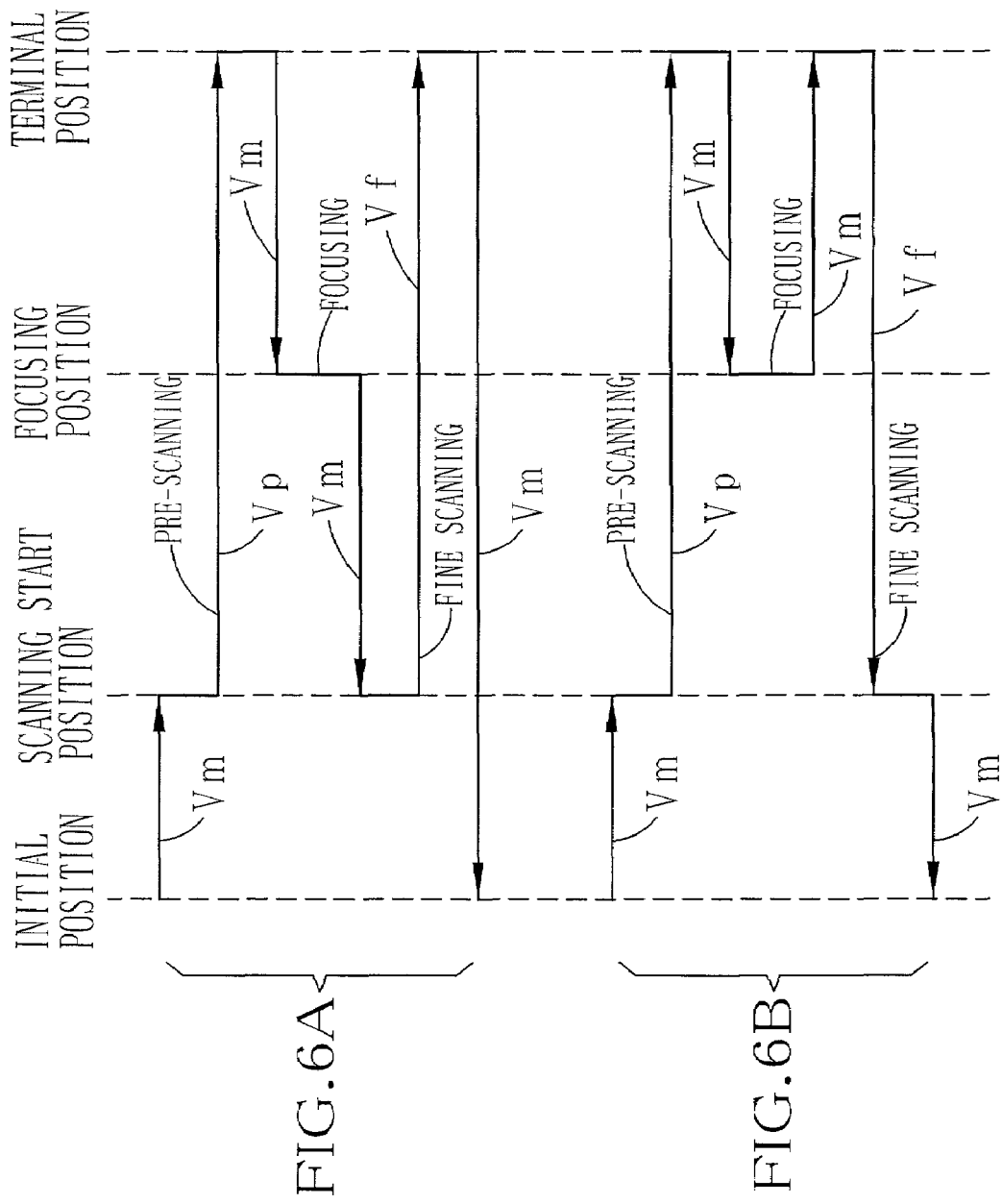
FIG. 6A is an explanatory diagram illustrating a conveying operation of a film table inside the film carrier for one scanning cycle of one picture frame.
FIG. 6B is an explanatory diagram illustrating a second embodiment of conveying operation of the film table for one scanning cycle.
Figure 7:
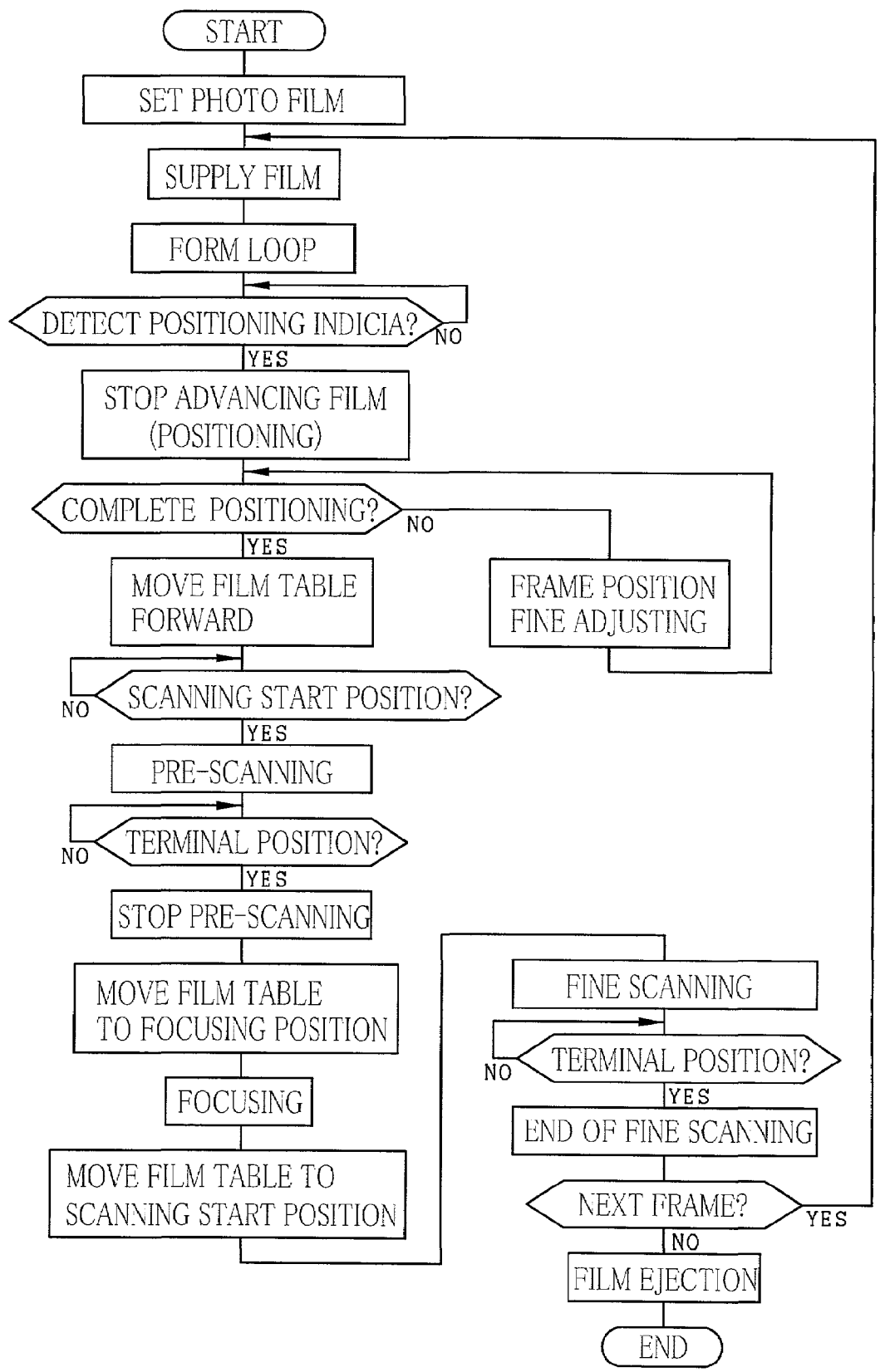
FIG. 7 is a flow chart illustrating the overall operation of the film scanner of the first embodiment.

Now the overall operation of the film scanner 11 will be described with reference to FIGS. 6 to 8.

A plurality of filmstrips forwarded from photographers to a photofinisher for development and printing are spliced into a long film web 17. Not-shown leader and trailer are also connected to opposite ends of the long film web 17, and the long film web 17 is subjected to the development. Thereafter, the long film web 17 is inspected through a not-shown film inspector, and the hole 17b is formed through the predetermined marginal position adjacent each of those picture frames 17a from which the photofinisher is ordered to make photo-prints, as shown in FIG. 5. As being located in the same position relative to each picture frame 17a, the holes 17b are useful for determining the position of the respective picture frames 17a.

After the inspection, the photographic film web 17 is wound around the film reel 45, and is set to the reel spool 84 of the film supply device 80. On the other hand, an empty film reel 45 is set to the reel spool 84 of the film wind-up device 44. Thereafter, the leader is put through the loop former 83, the film guide 46, the film carrier 36, the film guide 47, and the loop former 91 of the film wind-up device 44 to the empty film reel 45 on the film wind-up device 44. The leader is then secured to the empty film reel 45. After the photographic film web 17 is set in the film scanner 11, a scanning start key on the control panel is operated to start a scanning sequence.

Figure 8A:
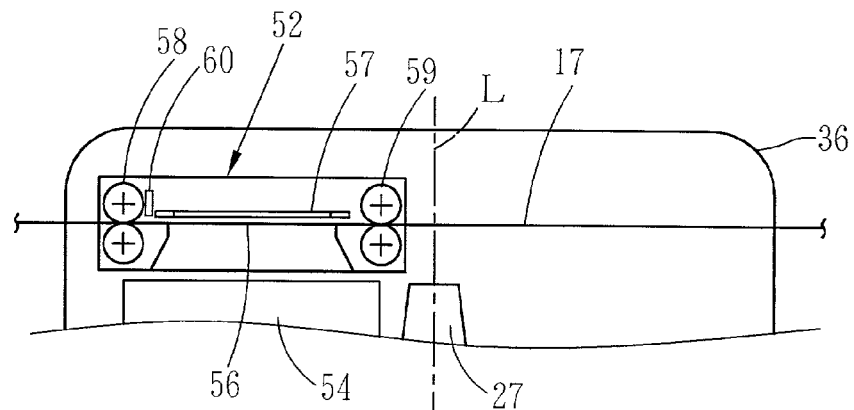
FIGS. 8A, 8B, 8C and 8D are explanatory diagrams illustrating the conveying operation of the film table according to the second embodiment.

At the start of scanning sequence, the film table 52 is placed in the initial position as shown in FIGS. 3, 5 and 8A, where the driven gear 65 is in mesh with the drive gear 66, so the driving force of the film feed motor 67 is transmitted to the roller pairs 58 and 59. In response to the operation on the scanning start key, the film feed motors 67, 87 and 94 are first driven to start feeding the photographic film web 17. The loop former 83 of the film supply device 42 puts a speed difference between the film supply roller pairs 85 and 86, so as to form the loop 17c of the predetermined length. In the same way, the loop former 91 of the film wind-up device 44 provides the loop 17d of a predetermined length.

As the photographic film web 17 is advanced in the film advancing direction D1, the hole sensor 60 detects the holes 17b, so the picture frames to scan are seriatim positioned on the light permeable window 56. While the photographic film web 17 is being advanced, the film table 52 is placed above the illumination box 54, so the operator may check if the picture frame 17a is properly positioned in the light permeable window 56. If the picture frame 17a deviates from the proper position, the position of the picture frame 17a may be adjusted by operating a fine-adjustment key that is not shown but provided in the film carrier 36.

Figure 8B:
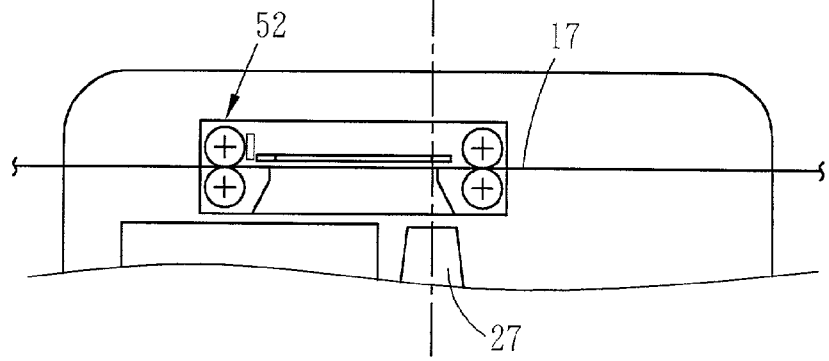
Figure 8C:
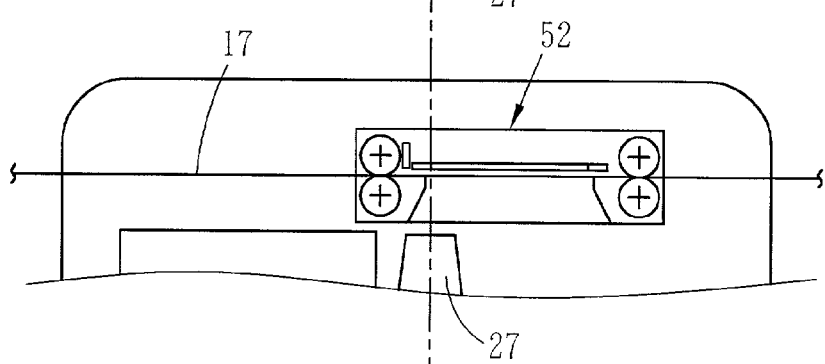
Figure 8D:
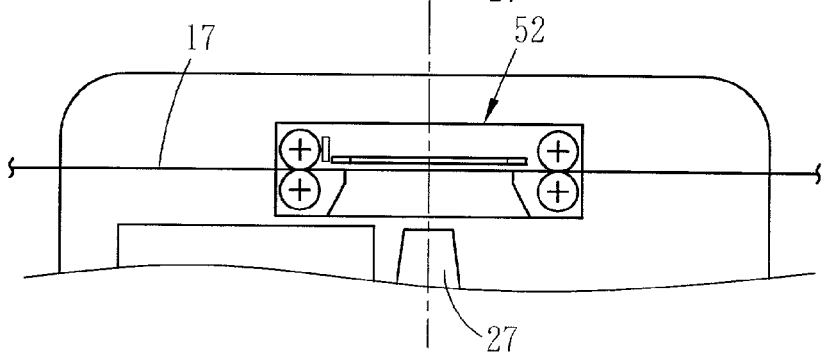

When the picture frame 17a is confirmed to be properly positioned in the light permeable window 56, the film scanner 11 starts scanning the picture frame 17a. First, the film table 52 is moved from the initial position as shown in FIG. 8A to scanning start position as shown in FIG. 8B, that is a predetermined amount to the right hand side in the drawings, that is forward to the film advancing direction D1. Then, as the film table 52 moves from the scanning start position to a scanning end position as shown in FIG. 8C, the film scanner 11 makes a pre-scanning at a low resolution. Thereafter, the film table 52 is moved from the scanning end position to the left hand side that is reverse to the film advancing direction D1. When the film table 52 reaches a focusing position as shown in FIG. 8D where a center of the picture frame 17a coincides with the optical axis L of the light source section 20, the film table 52 stops, and the focus of the optical image reading section 21 is adjusted in the interest of a next fine scanning process. Thereafter, the film table 52 is moved back to the scanning start position. During the focusing of the optical image reading section 21 and the returning of the film table 52 from the scanning end position to the scanning start position, conditions for the fine scanning are calculated on the basis of image data obtained by the pre-scanning. Then, the fine scanning is carried out at a high resolution under the conditions determined in this way, as the film table 52 is moved again from the scanning start position to the scanning end position. At the conclusion of the fine scanning, the film table 52 is moved back to the initial position.

While the film table 52 is being moved, the film feed motors 67, 87 and 94 are deactivated, so the vibrations may not be transmitted from the motors 67, 87 and 94 to the film table 52. Needless to say, as the film feed roller pairs 58 and 59 stop to nip the photographic film web 17 securely while the film table 52 is being moved in this way, the picture frame 17a is maintained in the proper position in the light permeable window 56. Even though the photographic film web 17 moves together with the film table 52 inside the film carrier 36 during the scanning process, the photographic film web 17 would not be too tensed because of the loops 17c and 17d formed by the loop formers 83 and 91. Since the picture frame 17a is maintained stable and flat without being deviated from the proper position, the accuracy of scanning is superior.

FIG. 6A shows the overall movement of the film table 52 during the scanning process, wherein Vm, Vp and Vf represent moving speeds of the film table 52 or the rotational speeds of the scanning motor 72, which are determined to satisfy the condition: $Vf<Vp<Vm$. That is, the film table 52 moves faster, i.e. at the speed of Vp, for the pre-scanning than the speed Vf for the fine scanning, and moves fastest when it is moved between the initial position and the scanning start position, and in the reverse or backward direction. This provides the most efficient movement of the film table 52.

Figure 9:
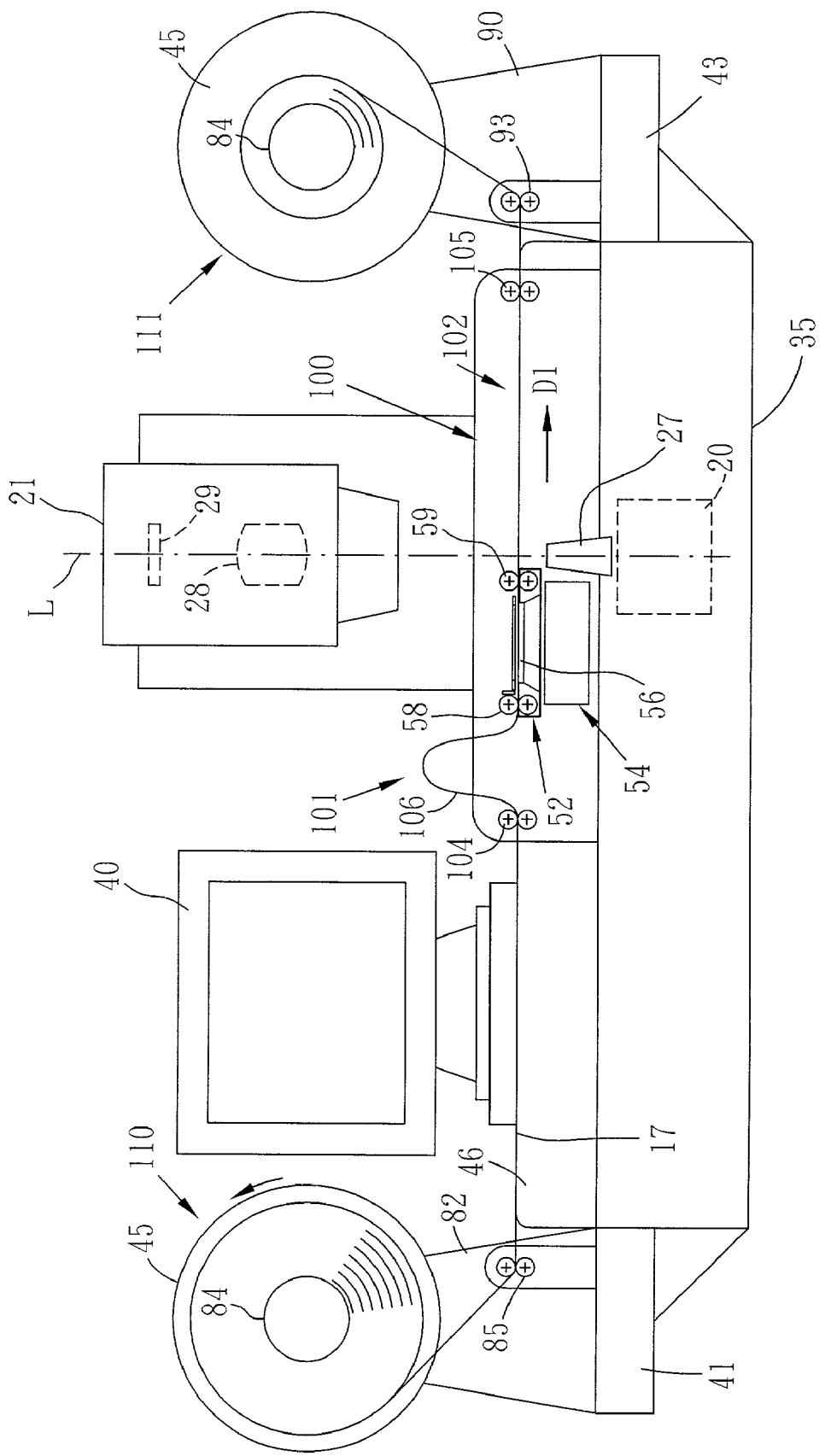
FIG. 9 is a front view illustrating an overall structure of a film scanner according to another embodiment of the present invention.

FIG. 9 shows a film scanner according to a second embodiment of the present invention, wherein a film carrier 100 is provided with loop formers 101 and 102 before and behind a movable film table 52. In this embodiment, a film supply device 110 and a film wind-up device 111 are not provided with such loop formers like the loop formers 83 and 91 of the first embodiment, so the film scanner becomes more compact. Other structures may be equivalent to those of the first embodiment, so the following description only relates to those elements essential for the second embodiment.

Figure 10A:
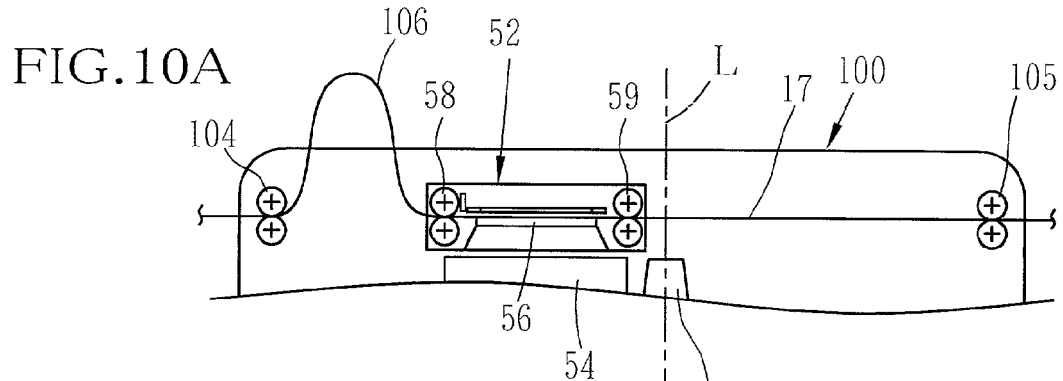
FIGS. 10A, 10B, 10C and 10D are explanatory diagrams illustrating loops formed in accordance with a conveying operation of a film table of the film scanner according to the embodiment of FIG. 9.
Figure 10B:
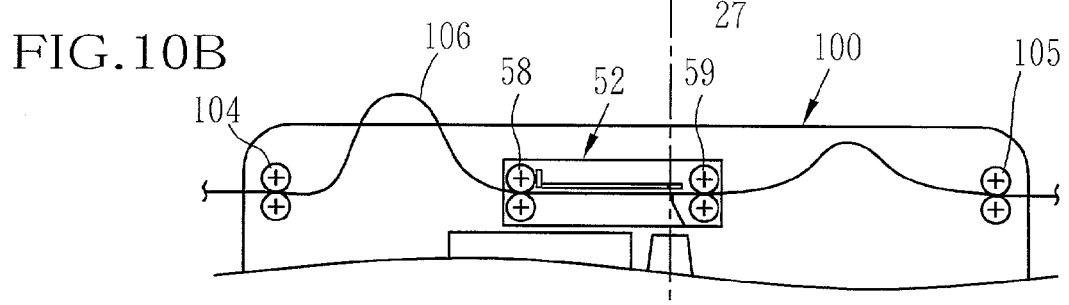
Figure 10C:
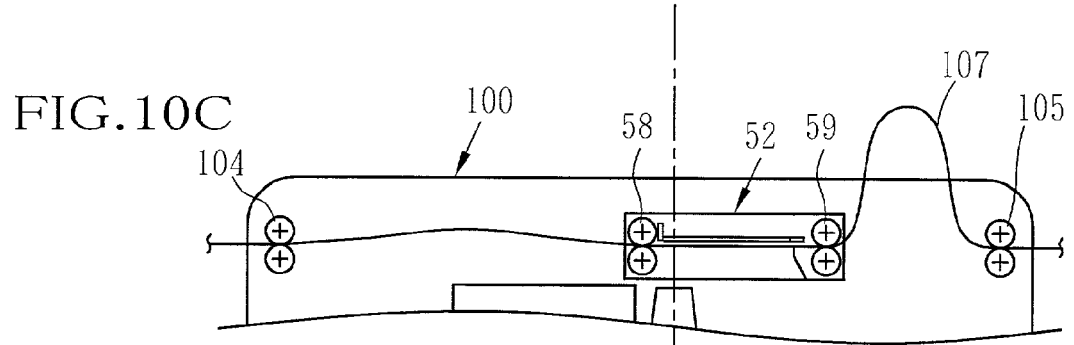
Figure 10D:
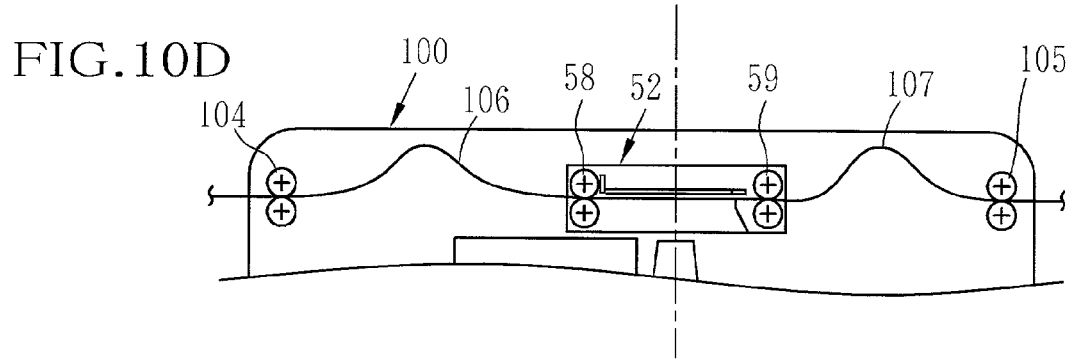

As shown in FIGS. 10A to 10D, the loop former 101 provides a loop 106 by putting a speed difference between film feed roller pairs 104 and 58, and the loop former 102 provides a loop 107 by putting a speed difference between film feed roller pairs 59 and 105. FIGS. 9 and 10A shows an initial position of the film table 52 where the loop 106 is formed before or in the upstream of the film table 52 in the film advancing direction D1. FIGS. 10B and 10C show a scanning start position and a scanning end position of the film table 52, respectively. FIG. 10D show a focusing position at which an optical reading section 21 is focused on the picture frame 17a as positioned in a light permeable window 56 of the film table 52.

Although the film table 52 makes two laps in one scanning cycle per one picture frame 17a, as shown in FIG. 6A, the film table 52 may be moved in a way as shown in FIG. 6B. That is, the film table 52 is moved from the initial position to the scanning start position, and further to the scanning end position for the pre-scanning. Then, the film table 52 is moved to the focusing position, in the same way as in the first embodiment, but thereafter the film table 52 is returned to the scanning end position. So the fine scanning is carried out while the film table 52 is being moved backward with respect to the film advancing direction D1, i.e. from the scanning end position to the scanning end position. According to the embodiment shown in FIG. 6B, the total amount of movement of the film table 52 in one scanning cycle is reduced as compared to the embodiment shown in FIG. 6A, so the scanning efficiency is improved. Since the scanning direction of the fine scanning is reversed from that of the pre-scanning, the obtained image data may be reversed to match the scanning directions electronically.

The method or structure of providing the loops in the photographic film web 17 is not limited to the above embodiment. For example, instead of putting a speed difference between two roller pairs 85 and 86, 92 and 93, 104 and 58, or 59 and 105, it is possible to use dancer rollers for forcibly providing the loops in the photographic film web 17.

Although the loop formers, that form the loop by putting a speed difference between the roller pairs, are disposed both before and behind the film table 52 in the above embodiment, it is possible to dispose such a loop former only before or behind the film table 52, and provide a loop by the movement of the film table 52 itself. For example, while the film table 52 is moving forward for the pre-scanning, the film supply device feeds out the photographic film web 17 at a speed that is equal to or higher than the moving speed of the film table 52, whereas the film wind-up device stands still. Thereby, a free loop is provided at least behind the film table 52. On the other hand, while the film table 52 is moved backward to the scanning start position or the initial position, the film supply device stops feeding the photographic film web 17, and a free loop is provided between the film table 52 and the film supply device. Thus, the photographic film web 17 would not be too tensed because of the free loops.

In the above embodiment, the film feed motor 67 is disposed underneath the base table 50, and the driving force of the film feed motor 67 is transmitted to the film feed roller pairs 58 and 59 through the driven gear 65 and the drive gear 66 which interlock with each other only in the initial position of the film table 52. Alternatively, the film feed motor 67 for the film feed roller pairs 58 and 59 may be mounted on the film table 52.

Although the above embodiment uses the holes 17b as the positioning indicia for the picture frames 17a, notches may be substituted for the holes 17b. It is possible to use a bar code as frame position data, where the bar code is previously provided in a constant position on the filmstrip relative to each picture frame. It is also possible to detect edges of the respective picture frames 17a for use in positioning the picture frames 17a. In that case, an edge position sensor or the like is used for detecting the picture frame edges.

The film scanner may be provided with a device for detecting splice tapes between the individual filmstrips of the spliced long film web, as indicia distinguishing the individual filmstrips from each other. It is also preferable to record data relating to the following filmstrip, such as a reception serial number and a customer ID number, on each splice tape in the form of a bar code or the like. Instead of using the splice tapes for discriminating between the individual filmstrips of the spliced web, it is possible to form a hole or a notch at a joint between two filmstrips.

Although the carrier mask 57 is used to hold the picture frame 17a flat and stationary in the light permeable window 56 of the film table 52, it is possible to fix the position of the picture frame 17a merely by the feed roller pairs 58 and 59. It is also possible to use a suction device for holding the photographic film web 17 on the film table 52. The suction device may be constituted of suction nozzles provided in those portions that come to contact with margins around the picture frame 17a when the picture frame 17a is positioned on the film table 52.

Thus, the present invention is not to be limited to the above embodiments but, on the contrary, various modifications will be possible to those skilled in the art without departing from the scope of claims appended hereto.

What is claimed is:

1. An image scanner for scanning picture frames photographed on photographic film comprising:
   a film advancing device for advancing a web of said photographic film in a film advancing direction from a reel of a film supply device through a film passageway to a film wind-up device;
   a film table disposed on said film passageway and movable along said film passageway while carrying said photographic film thereon;
   a light permeable window formed through said film table, said light permeable window having a size that covers a scanning area to scan within each of the picture frames;
   a frame positioning device for positioning the picture frames individually in said light permeable window;
   a light projection device for projecting light toward said photographic film through said light permeable window;
   a linear image sensor disposed across said film passageway from said light projection device, for obtaining an image signal from an optical image that is formed through an image-forming lens from light passing through the picture frame as positioned in said light permeable window;

a film table conveying device for conveying said film table along said film passageway back and forth between an initial position and a terminal position after one of the picture frames is positioned and fixed to said light permeable window, to let said image sensor scan the positioned picture frame line by line; and a loop former for forming a first loop of said photographic film between said film supply device and said film table and a second loop of said photographic film between said film table and said film wind-up device, wherein the first loop and the second loop are formed during automatic movement of the film by the loop former.

2. An image scanner as recited in claim 1, wherein said photographic film is formed into the long web by splicing a plurality of filmstrips having different picture frames thereon.

3. An image scanner as recited in claim 1, wherein said loop former is controlled to form said first loop at least before said film table starts moving forward with respect to the film advancing direction, and said second loop at least before said film table starts moving backward with respect to the film advancing direction.

4. An image scanner as recited in claim 3, wherein lengths of said first and second loops are determined such that said first loop has a maximum length before the start of the forward movement of said film table, whereas said second loop has a maximum length before the start of the backward movement of said film table, the maximum lengths of said first and second loop are greater than a distance between said initial position and said terminal position.

5. The image scanner as recited in claim 1, wherein the loop former comprises at least two pair of rollers for moving the film, and one of the first and second loops is formed by providing a difference in film conveying speed between a first pair of the rollers and a second pair of the rollers.

6. The image scanner as recited in claim 5, further comprising a sensor detecting amount of the loop formed by the loop former.

7. An image scanner for scanning picture frames photographed on photographic film comprising:

a film advancing device for advancing a long web of said photographic film in a film advancing direction from a reel of a film supply device through a film passageway to a film wind-up device;

a film table disposed on said film passageway and movable along said film passageway while carrying said photographic film thereon;

a light permeable window formed through said film table, said light permeable window having a size that covers a scanning area to scan within each of the picture frames;

a frame positioning device for positioning the picture frames individually in said light permeable window;

a light projection device for projecting light toward said photographic film through said light permeable window;

a linear image sensor disposed across said film passageway from said light projection device, for obtaining an image signal from an optical image that is formed through an image-forming lens from light passing through the picture frame as positioned in said light permeable window;

a film table conveying device for conveying said film table along said film passageway back and forth between an initial position and a terminal position after one of the picture frames is positioned and fixed to said light permeable window, to let said image sensor scan the positioned picture frame line by line; and a loop former for forming a first loop of said photographic film between said film supply device and said film table and a second loop of said photographic film between said film table and said film wind-up device, wherein said frame positioning device comprises a frame position detecting device for detecting position data of each of those picture frames which are determined to be scanned, and a fine adjusting device for adjusting position of the picture frame relative to said light permeable window by feeding said photographic film back or forth on said film table with reference to said position data independently of said film supply device and said film wind-up device.

8. An image scanner as recited in claim 7, wherein said position data is an indicia provided on said photographic film in association with each of those picture frames which are determined to be scanned before said photographic film is set in said image scanner.

9. An image scanner as recited in claim 7, wherein said fine adjusting device comprises two pairs of feed rollers mounted on said film table before and behind said light permeable window, and a motor for rotating said feed rollers.

10. An image scanner as recited in claim 9, wherein said motor is mounted stationary outside said film table.

11. An image scanner as recited in claim 9, wherein said motor is mounted to said film table and moves together with said film table.

12. An image scanner for scanning picture frames photographed on photographic film comprising:

a film advancing device for advancing a long web of said photographic film in a film advancing direction from a reel of a film supply device through a film passageway to a film wind-up device;

a film table disposed on said film passageway and movable along said film passageway while carrying said photographic film thereon;

a light permeable window formed through said film table, said light permeable window having a size that covers a scanning area to scan within each of the picture frames;

a frame positioning device for positioning the picture frames individually in said light permeable window;

a light projection device for projecting light toward said photographic film through said light permeable window;

a linear image sensor disposed across said film passageway from said light projection device, for obtaining an image signal from an optical image that is formed through an image-forming lens from light passing through the picture frame as positioned in said light permeable window;

a film table conveying device for conveying said film table along said film passageway back and forth between an initial position and a terminal position after one of the picture frames is positioned and fixed to said light permeable window, to let said image sensor scan the positioned picture frame line by line; and a loop former for forming a first loop of said photographic film between said film supply device and said film table and a second loop of said photographic film between said film table and said film wind-up device, wherein, when said film table is in said initial position, said light permeable window is placed outside a light path from said light projection device to said image sensor, and said image scanner further comprises an illumination device for illuminating the picture frame through said light permeable window when said film table is in said initial position, wherein the picture frame as illuminated by said illumination device may be observed from across said film passageway.

13. An image scanner as recited in claim 12, wherein said image scanner makes pre-scanning at a low resolution and fine scanning at a high resolution for each picture frame positioned in said light permeable window, and the pre-scanning is carried out as said film table is moved from a scanning start position toward said terminal position, said scanning start position being where said light permeable window enters the light path of said light projection device, and the fine scanning is carried out as said film table is moved again from said scanning start position toward said terminal position after said film table is moved back to said scanning start position after the pre-scanning, and wherein said image scanner makes focusing of said image-forming lens while stopping said film table for a moment at a focusing position on the way of the backward movement of said film table after the pre-scanning.

14. An image scanner as recited in claim 13, wherein said focusing position is where the picture frame as positioned in said light permeable window is adjusted to an optical axis of said image-forming lens.

15. An image scanner as recited in claim 12, wherein said image scanner makes pre-scanning at a low resolution and fine scanning at a high resolution for each picture frame positioned in said light permeable window, and the pre-scanning is carried out as said film table is moved from a scanning start position toward said terminal position, said scanning start position being where said light permeable window enters the light path of said light projection device, and the fine scanning is carried out as said film table is moved from said terminal position to said scanning start position, and wherein said image scanner moves said film table to a focusing position located between said terminal position and said scanning start position after the pre-scanning, makes focusing of said image-forming lens while stopping said film table for a moment at said focusing position, and then returns said film table to said terminal position before said fine scanning.

16. An image scanner as recited in claim 15, wherein said focusing position is where the picture frame as positioned in said light permeable window is adjusted to an optical axis of said image-forming lens.

* * * * *